United States Patent
Von Borck et al.

(10) Patent No.: US 9,306,224 B2
(45) Date of Patent: Apr. 5, 2016

(54) COOLING MODULE AND METHOD FOR PRODUCING A COOLING MODULE

(75) Inventors: Felix Von Borck, Darmstadt (DE); Björn Eberleh, Alsbach-Hähnlein (DE)

(73) Assignee: AKASOL ENGINEERING GMBH, Darmstadt (DE)

(*) Notice: Subject to any disclaimer, the term of this patent is extended or adjusted under 35 U.S.C. 154(b) by 414 days.

(21) Appl. No.: 13/820,499

(22) PCT Filed: Aug. 30, 2011

(86) PCT No.: PCT/EP2011/004361
§ 371 (c)(1),
(2), (4) Date: Jun. 14, 2013

(87) PCT Pub. No.: WO2012/028298
PCT Pub. Date: Mar. 8, 2012

(65) Prior Publication Data
US 2013/0266838 A1    Oct. 10, 2013

(30) Foreign Application Priority Data
Sep. 2, 2010 (DE) .......................... 10 2010 036 151

(51) Int. Cl.
*H01M 10/6552* (2014.01)
*H01M 6/50* (2006.01)
(Continued)

(52) U.S. Cl.
CPC ............. *H01M 6/5038* (2013.01); *B21D 53/06* (2013.01); *F28F 3/12* (2013.01); *F28F 9/0273* (2013.01); *F28F 9/26* (2013.01); *F28F 19/06* (2013.01); *H01M 10/5004* (2013.01); *H01M 10/613* (2015.04); *H01M 10/625* (2015.04);
(Continued)

(58) Field of Classification Search
CPC ..................... H01M 10/5004; H01M 10/5032; H01M 10/6551; H01M 10/6552; H01M 10/6554; H01M 10/6556; H01M 10/647; B21D 53/06; F28D 1/0475; F28D 1/0476
See application file for complete search history.

(56) References Cited

U.S. PATENT DOCUMENTS 7,989,104 B2    8/2011  Jeon et al.
8,623,536 B2    1/2014  Jeon et al.
(Continued)

FOREIGN PATENT DOCUMENTS

CN    101330135 A    12/2008
DE    102008054947 A1    6/2010
(Continued)

OTHER PUBLICATIONS

International Search Report and Written Opinion mailed Mar. 15, 2012, from International Application No. PCT/EP2011/004361, 52 pages.
(Continued)

*Primary Examiner* — Ula C Ruddock
*Assistant Examiner* — Thomas Parsons
(74) *Attorney, Agent, or Firm* — Kilpatrick Townsend & Stockton LLP

(57) ABSTRACT

The invention relates to method for the manufacture of a cooling module in the form of a body having an inner space for the reception of battery cells, wherein the body has one or more cooling passages extending in parallel to one another between an inlet region and an outlet region and is formed at least partly from a length or from a plurality of lengths of a hollow section.

17 Claims, 15 Drawing Sheets

(51) Int. Cl.
   *F28F 3/12* (2006.01)
   *F28F 9/02* (2006.01)
   *F28F 9/26* (2006.01)
   *H01M 10/613* (2014.01)
   *B21D 53/06* (2006.01)
   *F28F 19/06* (2006.01)
   *H01M 10/625* (2014.01)
   *H01M 10/647* (2014.01)
   *H01M 10/6556* (2014.01)
   *H01M 10/6551* (2014.01)
   *H01M 10/6555* (2014.01)
   *F28D 1/047* (2006.01)
   *F28D 21/00* (2006.01)
   *H01M 10/0525* (2010.01)

(52) U.S. Cl.
   CPC ........ *H01M 10/647* (2015.04); *H01M 10/6551* (2015.04); *H01M 10/6555* (2015.04); *H01M 10/6556* (2015.04); *F28D 1/0476* (2013.01); *F28D 2021/0028* (2013.01); *H01M 10/0525* (2013.01); *Y02T 10/7011* (2013.01); *Y10T 29/49391* (2015.01)

(56) References Cited

U.S. PATENT DOCUMENTS

| | | | |
|---|---|---|---|
| 2001/0031392 A1* | 10/2001 | Ogata et al. | 429/99 |
| 2006/0093899 A1 | 5/2006 | Jeon et al. | |
| 2007/0018610 A1 | 1/2007 | Wegner | |
| 2007/0133151 A1 | 6/2007 | Jeon et al. | |
| 2009/0023056 A1 | 1/2009 | Adams et al. | |
| 2010/0147488 A1* | 6/2010 | Pierre et al. | 165/47 |
| 2010/0252241 A1* | 10/2010 | McDermott et al. | 165/151 |
| 2012/0183823 A1 | 7/2012 | Von Borck et al. | |

FOREIGN PATENT DOCUMENTS

| | | |
|---|---|---|
| DE | 10 2009 018 787 A1 | 10/2010 |
| JP | 2000-108687 A | 4/2000 |
| JP | 2001-015090 A | 1/2001 |
| JP | 2005-268004 A | 9/2005 |
| JP | 2006-135008 A | 5/2006 |
| JP | 2008-103248 A | 5/2008 |
| JP | 2009-277471 A | 11/2009 |
| JP | 2009-277561 A | 11/2009 |
| JP | 2010-092860 A | 4/2010 |
| WO | 01/31392 A1 | 5/2001 |
| WO | 03/103083 A2 | 12/2003 |
| WO | 2006/093899 A2 | 9/2006 |
| WO | 2007/018610 A1 | 2/2007 |
| WO | 2009/023056 A1 | 2/2009 |
| WO | 2009/146876 A1 | 12/2009 |
| WO | 2010/069713 A1 | 6/2010 |
| WO | 2010/121832 A1 | 10/2010 |
| WO | 2012/028298 A3 | 3/2012 |

OTHER PUBLICATIONS

International Preliminary Report on Patentability mailed Mar. 5, 2013, from International Application No. PCT/EP2011/004361, 43 pages.

* cited by examiner

ERSATZBLATT (REGEL 26)

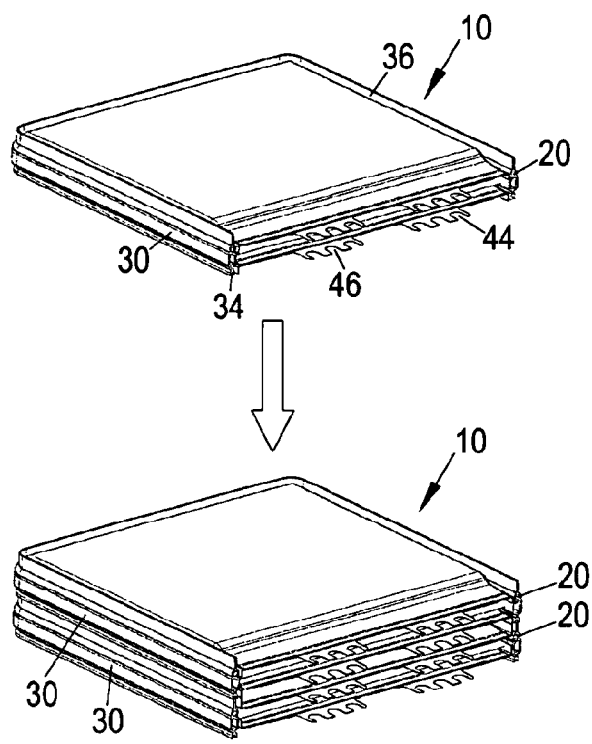
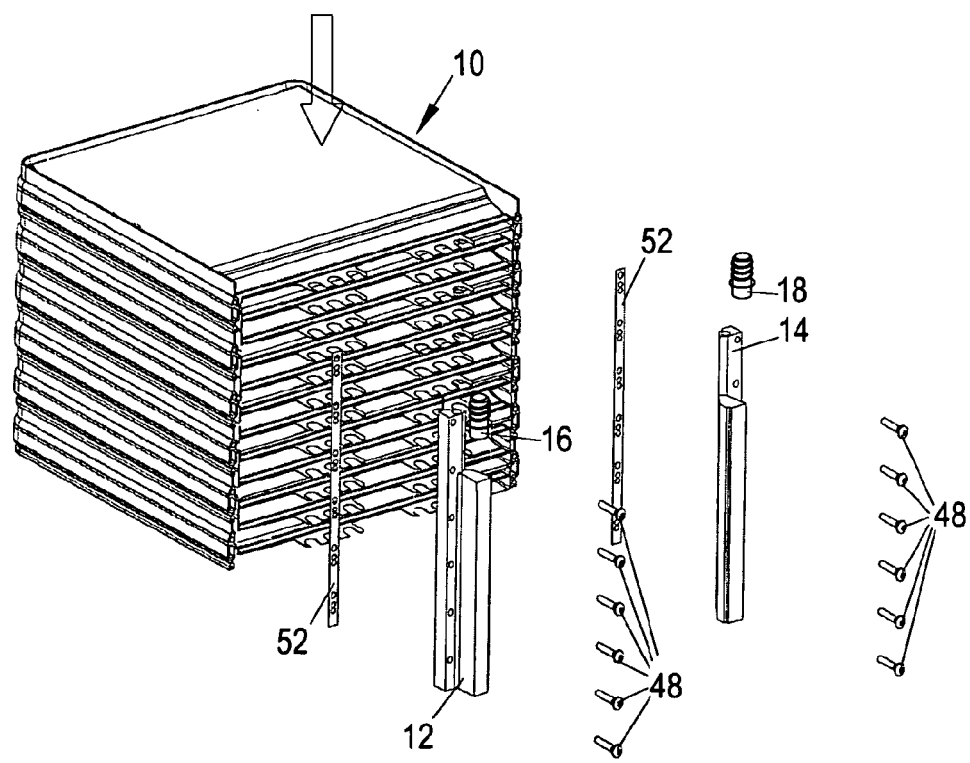
Fig.5
ERSATZBLATT (REGEL 26)

ERSATZBLATT (REGEL 26)

ERSATZBLATT (REGEL 26)

COOLING MODULE AND METHOD FOR PRODUCING A COOLING MODULE

CROSS-REFERENCES TO RELATED APPLICATIONS

This application is a U.S. National Phase under 35 USC 371 of PCT Application No. PCT/EP2011/004361 filed Aug. 30, 2011, which claims priority to the German Application No. 10 2010 036 151.8, filed Sep. 2, 2010, the disclosures of which are incorporated by reference herein.

BACKGROUND OF THE INVENTION

The present application relates to a method for the manufacture of a cooling module and to a corresponding cooling module for a battery module composed of one or more cells, in particular having accumulators, in particular lithium ion cells, which are used for the formation of a traction battery and/or a traction battery module for vehicles having an electric drive chain. Such battery modules can, for example, be used in electric vehicles, hybrid vehicles with combustion engines or hybrid vehicles with fuel cells. Through the modular assembly of a battery module in accordance with the invention this can also be used for different purposes, for example, for stationary applications or small traction applications, such as e.g. in a wheelchair.

In the published PCT application of Akasol Engineering GmbH, Publication No. WO2010121832 A1, a cooling module for a battery module composed of a plurality of cells, in particular with accumulators, in particular lithium ion cells, is described which are used for the formation of a traction battery and/or a traction battery module for vehicles having an electric drive chain.

A battery module system which is assembled from a plurality of like battery modules can, for example, be designed in order to cover a power range having a content of energy of between 1 kWh and 400 kWh or more. When, for example, a battery module system is designed for a continuous power of 20 kW, peak powers of, for example, 100 kW can still be required from the battery for acceleration purposes on a short term basis, whereby excellent acceleration values can be achieved. One can work with a charging power of 40 kW, for example, during charging operations.

The above stated values are purely exemplary, however, on the other hand, represent values which can generally be achieved with commercially available lithium ion batteries.

The cooling module in accordance with the above mentioned PCT application should be of compact design and be thermically optimized and, in particular be configured so that the operating temperature of the battery module and/or the battery module system can be maintained within narrow boundaries in order to, if possible, avoid the local overheating of individual cells, increased temperatures of one or more cells, or the operation at too low a cell temperature.

In order to satisfy this object, a cooling module for a battery module composed of a plurality of cells is provided in the mentioned PCT application which is characterized in that the cooling module has cooling plates at at least first and second oppositely disposed sides and is provided with heat conducting connection plates extending between these two sides which form compartments for receiving the cells therebetween, wherein the cooling module is preferably approximately of the shape of a parallelepiped.

In the likewise published German patent application of the Akasol Engineering GmbH, Publication No. DE 10 2009 018 787 A1, a method for the manufacture of a cooling module for a rechargeable battery is provided, wherein the cooling module is approximately of the shape of a parallelepiped and has a liquid cooling at at least three consecutive sides, wherein an approximately rectangular sheet metal plate or an approximately rectangular region of a sheet metal strip is pressed in order to form a groove-like inlet region and a groove-like outlet region at two oppositely disposed sides of the rectangle, as well as forming a plurality of grooves extending at least substantially parallel to one another between the inlet region and the outlet region. The rectangular shaped plate and/or the rectangular shaped region of the strip is subsequently bent at at least two positions in order to form two substantially rectangular corners.

Such a method can be easily reproduced in a production plant in a cost-effective manner and indeed with very little material loss, whereby a series production of cooling modules is possible economically in large numbers. Through the use of sheet metal and/or aluminium or an aluminium alloy as a starting material, a relatively stiff structure can be generated with relatively thin sheet metal, for example having a thickness of approximately 1 mm, since the ribs not only serve for the cooling, but also for the stiffening. Furthermore, the thin-walled design leads to a light weight cooling module. The use of aluminium sheet metal promotes the reduction of weight.

The operating temperature of the individual battery cells should, however, not exceed a working range of e.g. 18° to 25° C., as otherwise the lifetime of the individual battery cells of a battery module can be drastically reduced in part. Due to the fact that in previous cooling modules the cooling sheet metal parts where typically subsequently provided with coolant circuits in order to realize the cooling of the battery cells, problems with regard to cooling can arise since the thermal transfer of the coolant cannot always be sufficiently ensured.

BRIEF SUMMARY OF THE INVENTION

It is the object of the present application to provide an alternative method for the manufacture of a modular cooling module and/or an alternative design of a modular cooling module which likewise permits an excellent heat exchange between the battery cells and the coolant. Furthermore, also for the alternative design, an extremely rational manufacture should be ensured which can be carried out with little demand on material and at small economic costs.

To satisfy this object a method for the manufacture of a cooling module as well as a cooling module in accordance with the independent claims is provided.

Advantageous embodiments of the invention are described in the subordinate claims, the description, and the figures.

In accordance with the invention a method for the manufacture of a cooling module is provided in which method the cooling module is provided with the shape of a body having an inner space for the reception of battery cells, wherein the body has one or more cooling passages extending in parallel to one another between an inlet region and an outlet region and is formed at least partly from a length or from a plurality of lengths of a hollow section.

Such a method can be carried out cost-effectively in a reproducible manner in a production plant and indeed with very little material loss, since simple hollow sections can now be used which have a cooling passage and which can be pre-manufactured in an independent prior work step to a desired length and/or can be made in the desired length during the mass production of cooling modules, whereby a series production of cooling modules in large numbers is possible.

Through the use of e.g. aluminium or an aluminium alloy as a starting material, a stiff structure can be formed with relatively thin wall thicknesses of the hollow sections of approximately 0.5 to 5 mm, since the walls of the hollow sections not only serve for the guidance of coolant, but also for the stiffening of the cooling module. Furthermore, the thin walled design leads to a light weight cooling module. The use of aluminium sheet metal can promote the reduction of weight. Preferably light metals such as e.g. aluminium or magnesium and/or their alloys, are used as starting material for the hollow sections. Preferably materials are used which have a high heat conductivity (e.g. aluminium, approximately 200 W/mK).

Hollow sections can be manufactured simply in an extrusion process. Strands of metal and/or metal alloys can be extruded into a predefinable shape in such a method at temperatures of approximately 700° C. (aluminium and it alloys) up to 1400° C. (steel) in a semi-continuous process. The shapes can have diameters of up to 400 mm and can be provided with hollow spaces. The shape can be drawn to lengths of several 100 m as required. The finished section can, however, also be divided to a desired length, e.g. by use of a saw ("flying saw"), as soon as an extruded section has sufficiently solidified.

In a preferred embodiment, at least two hollow sections are used. These are preferably configured to be connected to one another at their longitudinal sides. Due to the fact that the hollow sections can be connected at their longitudinal sides, a cooling module is additionally stiffened which leads to an even more robust assembly.

Due to the fact that the cooling module is manufactured by at least two hollow sections, a modular design of the cooling module can be achieved, since a desired height of the cooling module can be achieved simply through the selection of a predefinable number of hollow sections. This means that different sizes of cooling modules can be manufactured simply in a production plant, since the same starting material can always be used for the individual battery modules. The starting material is cut to a desired length as required and can be varied in its height simply by the required number of hollow sections.

Preferably the hollow sections can be connected to one another by bonding and/or by brazing and/or by welding and/or by pressing and/or by screwing/clamping and/or by gripping and/or by means of clinching and/or by means of a tongue and groove connection. Thereby a displacement of the hollow sections relative to one another can be avoided in a simple and cost-effective manner, and also a cohesion in a direction perpendicular to the longitudinal direction of the hollow sections can be ensured.

In a preferred embodiment, the body of the cooling module is approximately of the shape of a parallelepiped and has a liquid cooling at at least three consecutive sides. The or each length of hollow section is bent at at least two positions, preferably into a U-shape, in order to form at least two typically substantially rectangular corners.

Alternatively, the hollow sections can also be bonded, brazed or welded to one another at their abutting ends in a fluid conducting manner in order to form a substantially rectangular cooling module.

As an alternative to this, consecutive hollow sections can be connected to one another in a fluid conducting manner by means of arc elements in order to form a substantially rectangular cooling module.

For all three aforementioned alternatives the cooling module has at least three consecutive sides which each have a cooling passage. Thereby, one or more battery cells can be cooled from at least three sides. The inlet region and the outlet region can thereby be simply provided at a side of the cooling module, preferably at the same side of the cooling module, where the connections of the poles of the battery cells are provided.

Through the bending of the hollow section or through the connection of hollow sections at their edges a cooling module in the shape of a parallelepiped having at least three sides is formed, whereby the basic shape of the body of a cooling module and/or a part of the cover of a cooling module is manufactured in an economic manner. The rectangular shape enables the use of the cooling module with rectangular battery cells as are manufactured by default.

Preferably the lengths of hollow sections used can be bent prior to or after their connection depending on the requirement and the number of the lengths of hollow sections used. It can thereby be ensured on use of a plurality larger lengths of hollow section that these are bent correctly, since it is more economic to bend these separately from a certain size of hollow section (e.g. wall thickness of 2 mm) in order to minimize the discharge of erroneously bent hollow sections.

Depending on the kind of hollow section it can, however, also be simpler to combine individually bent hollow sections to a cooling module.

In a particularly preferred embodiment the cooling module having three sides is subsequently provided with sheet metal connection plates. These are attached to the hollow sections in a heat conducting manner at at least two oppositely disposed sides of the cooling module and are preferably attached at three sides of the cooling module and form compartments therebetween which are dimensioned for the reception of battery cells, wherein the sheet metal connection plates lie in parallel planes and the cooling passages preferably run in parallel to the parallel planes.

Through the use of a sheet metal connection plate the battery cells, which can be placed into a cooling compartment, can be cooled from at least one of their large area sides. This enables an even more precise control of the operating temperature of the individual battery cells, since these are now cooled from their upper and/or lower sides. The cooling plates can, moreover, lead to a stabilization of the cooling module. The connection of the cells to a cooling structure takes place via pressing or through thin electrically insulated heat conductible layers (e.g. adhesives, adhesive films).

Preferably, the sheet metal connection plates are inserted into guide grooves which extend in the longitudinal direction of the lengths of hollow section. After the installation the sheet metal connection plates can be attached at the guide grooves by means of brazing, welding, bonding, frictional forces or in a different manner, in order to ensure an even better heat transfer between the hollow sections and the sheet metal connection plates. However, also a heat transfer paste can be provided in or at the groove which improves a heat exchange between the sheet metal connection plate and the hollow section.

In a preferred embodiment the length of hollow section has at least one cooling wing, wherein the cooling wing is notched at positions at which the lengths of hollow section are bent.

The cooling wings can thereby be provided in an extrusion step on the manufacture of the hollow sections and thereby ensure an even better heat transfer of the heat of the battery cells, which can be inserted into a cooling module in accordance with the invention, to the coolant which is guided through the cooling passage(s).

In a particularly preferred embodiment a distributor is provided in the inlet region, the distributor being arranged approximately perpendicular to the individual cooling passages and distributing coolant into the individual cooling passages during operation, and/or wherein a collector is provided in the outlet region, the collector being arranged approximately perpendicular to the cooling passages and receiving and guiding the coolant from the individual cooling passage to an outlet.

The distributor can thus supply the individual cooling passages of the individual hollow sections with coolant in a simple manner and can thereby ensure that the battery cells, which can be installed in the cooling module, are cooled in a simple manner. The collector can collect the heated coolant at a point and simply guide this away from the cooling passages.

The coolant can be guided from the collector to a heat exchanger in order to be brought to the desired operating temperature before the coolant is guided into the distributor (again). A coolant which is used in the automotive industry is preferably used as a coolant, in particular a coolant for aluminium components, such as e.g. an aluminium motor.

Preferably the distributor and/or the collector are welded, brazed, bonded or attached in a different manner to the hollow section and/or to the hollow sections, for example, by means of a crimped connection and are in particular additionally screwed to the hollow section and/or to the hollow sections. Thereby a liquid-tight connection can be ensured between the distributor and/or collector and the hollow section and/or the hollow sections, and a stabilizing effect can also be brought about at the inlet region and/or at the outlet region of the hollow sections. The distributor and/or collector can be manufactured cost-effectively and rationally as plastic injection molded parts, aluminium pressure die cast part or aluminium fine cast parts and can thereby also lead to a further weight reduction of the cooling module. Alternatively, the collector and/or the distributor can likewise be manufactured as an extruded part.

In a preferred embodiment the finished cooling module or the hollow sections are post-treated by an anodic treatment method and/or a powder coating method. The cooling module can also be provided e.g. with a colored layer in order to protect this from dirt, e.g. road dirt, and to thereby increase the lifetime of a cooling module. The protective layer can moreover take on the function of an electric insulation.

In accordance with the invention a cooling module is also provided, wherein the cooling module has the shape of a body having an inner space for the reception of battery cells, wherein the body has one or more cooling passages extending in parallel to one another between an inlet region and an outlet region and is manufactured at least partly from a length or from a plurality of lengths of a hollow section.

For a cooling module which has at least one cooling wing the space which is formed between the cooling wings and the battery cells is filled with an insert which can have one of the following functions: a heat conducting function, a fire resistant function, and a mechanically supporting function. This insert can be laid into, bonded to, welded to, brazed to, or connected to the battery cell and/or to the hollow section in a different manner.

Preferably, the bent hollow section is stabilized by a support section, e.g. a fiber-reinforced plastic tube, at the front ends of the cooling module.

In an embodiment of the cooling module the battery cell is electrically insulated with regard to the hollow section at the support sections at the hollow section, e.g. by means of a self-adhesive film or a coating.

The battery cells are in particular insulated in regions with respect to the cooling module, e.g. at the cutouts of the cooling wings, in the corners at the hollow section or with respect to the collector and/or the distributor by insertion of electrically insulating strips, e.g. of plastic.

In accordance with the invention a hollow section is also provided which is in particular suitable for the application in a method in accordance with the invention and/or which can be used in a cooling module in accordance with the invention. The hollow section has at least one passage for guiding a coolant, a groove arranged at an outer side of a wall of the passage and a tongue arranged at the oppositely disposed outer side, with the tongue and groove lying in a common plane.

In accordance with the invention a method for the manufacture of at least one component of a cooling module in accordance with the invention is also provided, with the component being manufactured as an extruded section. This enables a particularly cost-effective assembly of the cooling module. Typical components of a cooling module which can be manufactured as extruded sections are a distributor, a collector, a support section, or a hollow section.

The advantages which were explained in connection with the various embodiments of the method in accordance with the invention are true in an analog manner for the adaptation of the cooling module in accordance with the invention as well as for the hollow section in accordance with the invention.

BRIEF DESCRIPTION OF THE DRAWINGS

The invention will be described in detail in the following by means of embodiments with reference to the drawing, in which are shown:

FIG. 5 is a perspective illustration of the assembly of a cooling module in accordance with the invention with associated battery cells;

DETAILED DESCRIPTION OF THE INVENTION

Figure 1:
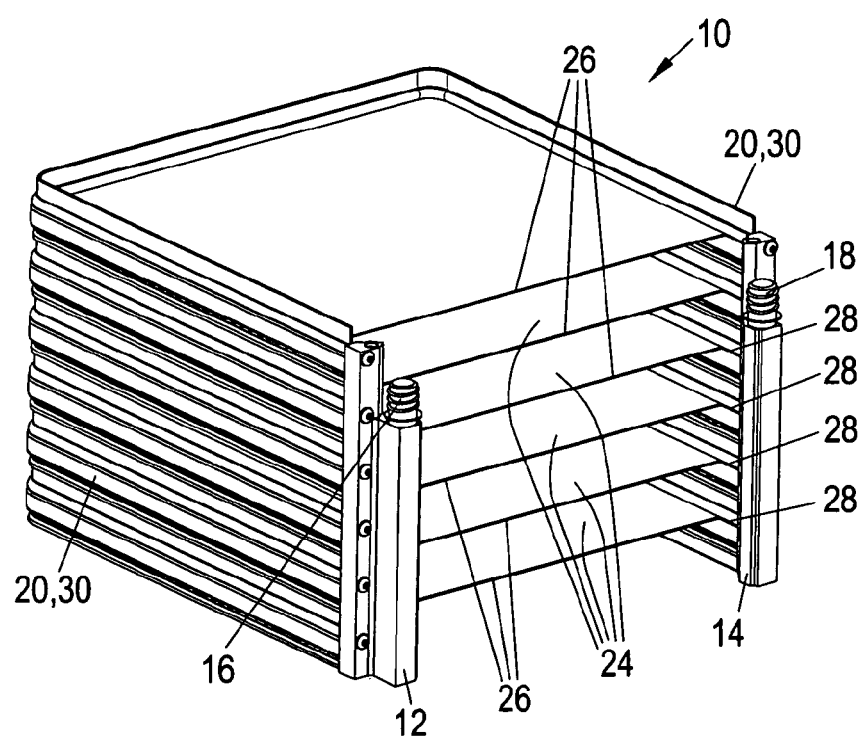
FIG. 1 is a perspective illustration of a cooling module in accordance with the invention.

Features having the same or a similar function will be provided with the same reference numeral in the following and it is naturally understood that the description which is provided for components or component functions in connection with an embodiment are also true for other embodiments in which the same reference numerals are used, unless something is said to the contrary.

The FIG. 1 shows a perspective illustration of a cooling module 10 in accordance with the invention. The cooling module 10 substantially has the shape of a parallelepiped and has a distributor 12 in its inlet region and a collector 14 in its outlet region. The distributor 12 and the collector 14 each have a connection 16, 18 by means of which the coolant can be supplied and/or removed. Six cooling passages 20 running in parallel to one another extend between the distributor 12 and the collector 14. In order to ensure the cooling of the individual battery cells 22 (see FIG. 4) which can be inserted into the compartments 24 of the cooling module 10, six cooling plates 26 extend substantially in parallel to the individual cooling passages 20 in the present example. The cooling plates 26 are introduced into premanufactured grooves 28 of a hollow section 30. The cooling passages 20 are formed in the premade hollow section 30.

Figure 2A:
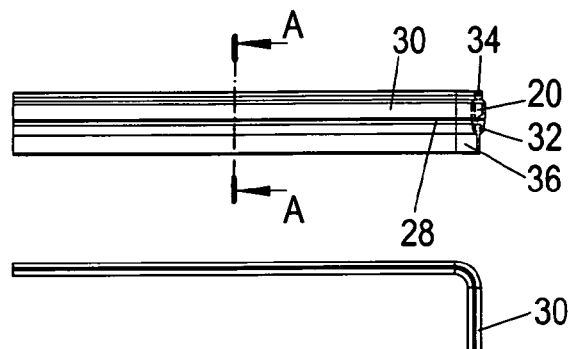
FIG. 2A is a hollow section in accordance with the invention.

The FIG. 2A shows a side view of a hollow section 30 in which the groove 28 extends substantially along the center of the hollow section 30 in parallel to the longitudinal direction of the hollow section 30.

Figure 2B:
FIG. 2B is a U-shapedly bent hollow section in accordance with the invention.
Figure 2C:
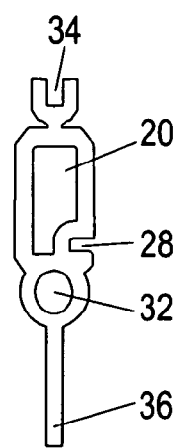
FIG. 2C is a section through the hollow section in accordance with the invention of FIG. 2A in the plane A-A of the FIG. 2A.

The FIG. 2B shows a top view onto the bent hollow section 30 of FIG. 2A. The FIG. 2C shows a section along the sectional line A-A of the hollow section 30 of FIG. 2A. The hollow section 30 of FIG. 2C has a cooling passage 20, a screw hole 32 as well as the groove 28 which is provided between the screw hole 32 and the cooling passage 20. At the upper and lower ends of the longitudinal direction of the hollow section 30 a groove and a tongue 34, 36 can be seen which are configured to connect a plurality of hollow sections 30 at their longitudinal sides to one another. Due to the fact that the tongue 36 of the hollow section 30 is guided into the groove 34 of an adjacent hollow section 30 a tongue and groove connection arises.

Figure 3A:
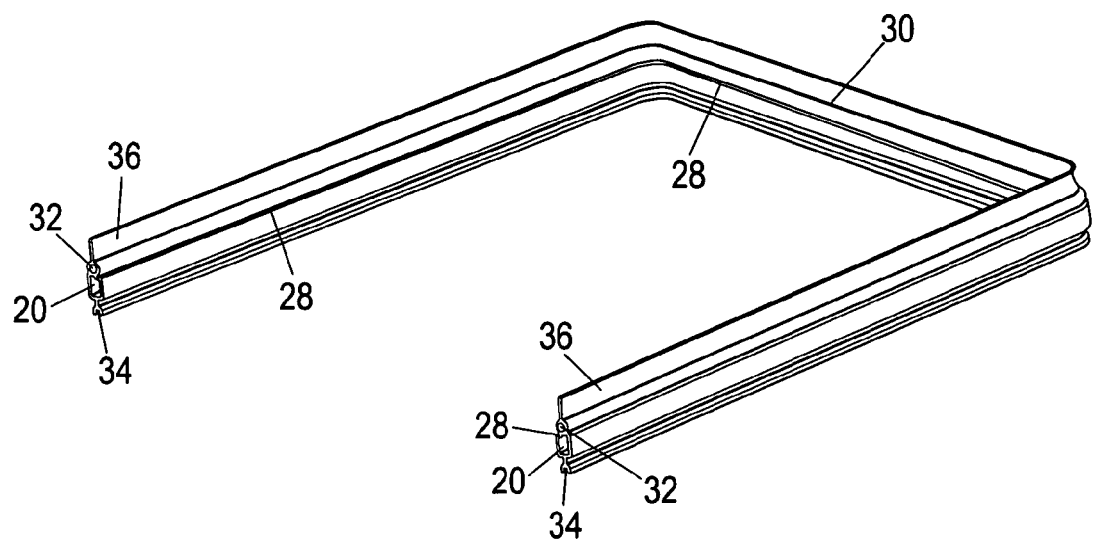
FIGS. 3A, 3B are perspective illustrations of hollow sections in accordance with the invention.

The FIG. 3A shows a perspective illustration of the hollow section 30 of the FIGS. 2A to 2C. The cooling passages 20, the groove 28, the tongue-and-groove 34, 36 as well as the screw hole 32 can be recognized at the respective ends 38 of the hollow section 30.

Figure 3B:
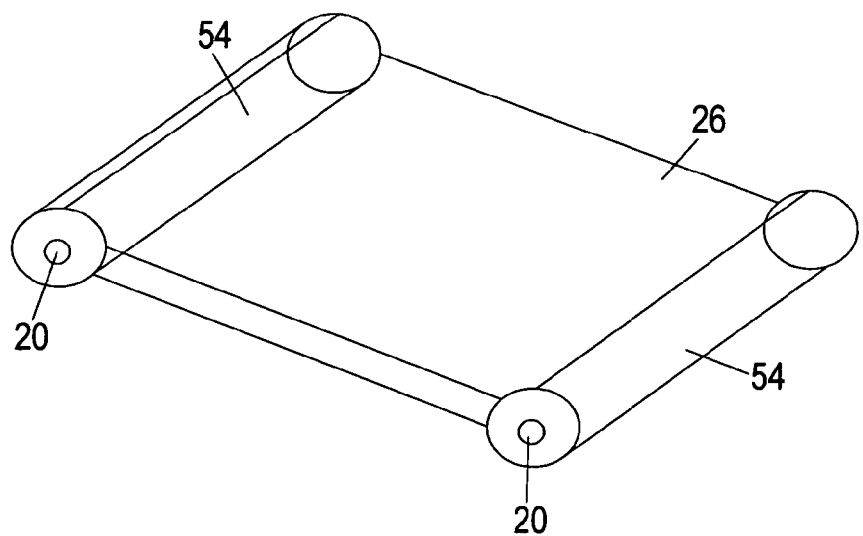
Figure 10A:
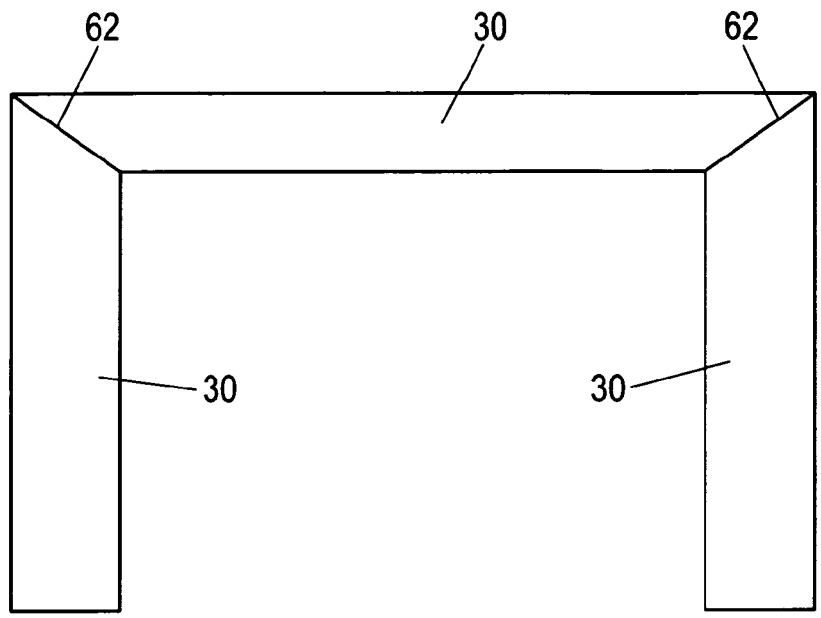
FIGS. 10A, 10B are views of connected hollow sections in accordance with the invention.
Figure 10B:
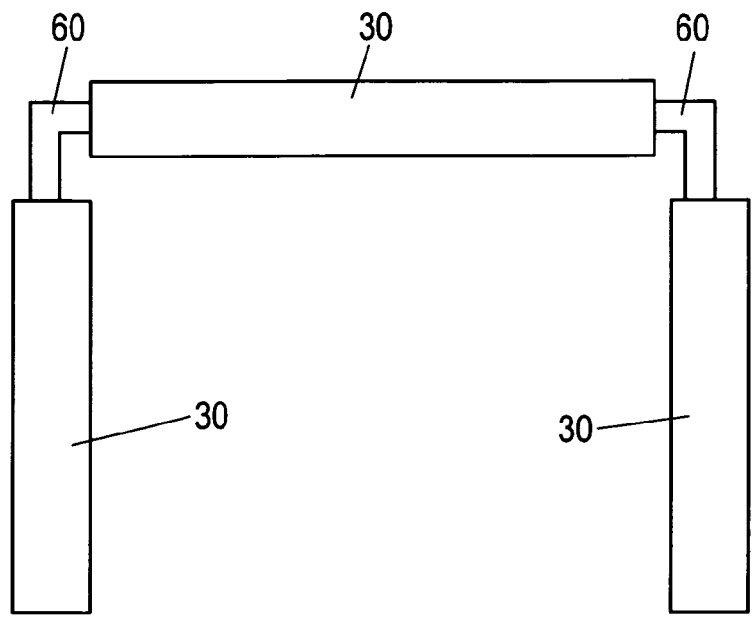

The FIG. 3B shows a perspective illustration of a hollow section 30 which has two hollow fluid passages 20 at its lateral sections 54. A planar wall section 26 extends between the lateral sections 54. Hollow sections 30, as are shown in FIG. 3B, can be stacked simply on top of one another and can thereby form a cooling module 10 which has cooling passages 20 at at least two sides. These can be respectively connected to a distributor 12 and/or to a collector 14 in a fluid-conducting manner. As an alternative to this, at least one end of a cooling passage could also be connected by means of an arc section 60 (FIG. 10B) or a connection plate, which each have at least one cooling passage 20 to an end of the second cooling passage 20 in a fluid-conducting manner so that such a cooling module 10 can also have a liquid cooling at at least three sides.

Figure 4:
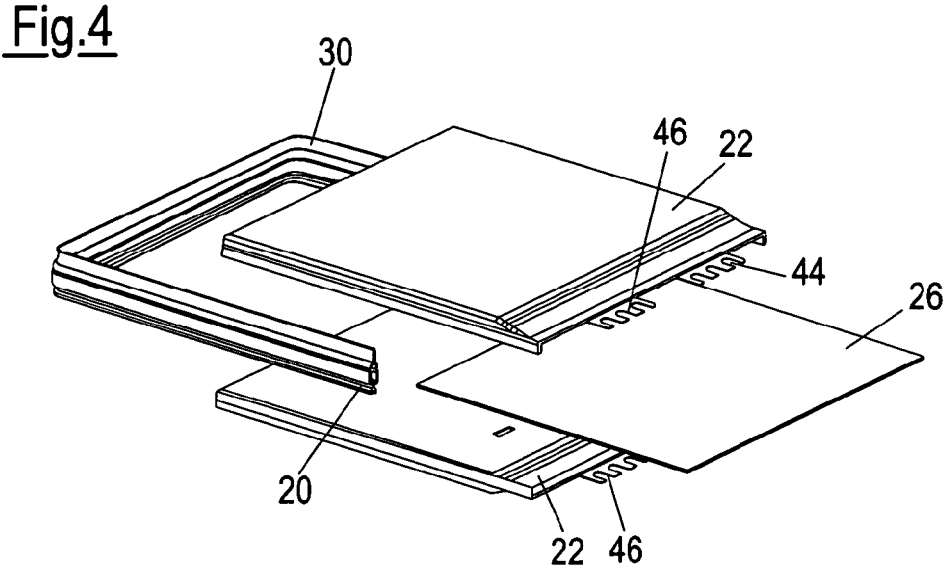
FIG. 4 is an exploded view of a U-shapedly bent hollow section in accordance with the invention with inserted cooling plates.

The FIG. 4 shows an exploded illustration of a hollow section 30 which is U-shapedly bent. The U-shapedly bent hollow section 30 comprises a so-called cooling plate 26 which can be inserted into the groove 28 after the bending of the hollow section 30.

Furthermore, the FIG. 4 shows two battery cells 22 which each have positive and negative connections 44, 46 and which can e.g. be battery cells 22 for a battery module 50 (see FIG. 5) of a traction battery (a so-called electric vehicle battery). The U-shaped shape of the hollow section 30 is matched to the shape of the battery cells 22 which should be provided in the cooling module 10. This means that the hollow section 30 is bent such that the complete length of the battery cell 22 and the width of the battery cell 22 can be inserted into the individual compartments 24 of a cooling module 10 without a problem; however, should still enable an assembly man and/or a mechanic to connect the contacts 44, 46 of the individual battery cells 22 to one another in order to provide a battery module 50 with the desired power.

After a hollow section 30 has been bent to a U-shape and the battery cells 22 have been inserted into their provided compartments 24, a plurality of these hollow sections 30 can be combined, as can be seen from FIG. 5, and, depending on the requirement, a cooling module 10 and/or a battery module 50 can be provided having two and/or four and/or six, etc. of such battery cells 22. Once the desired number of battery cells 22 have been assembled in a cooling module 10 having the U-shaped hollow sections, a sealing material 52 is attached at the respective inlet and/or outlet regions in order to manufacture a liquid-tight connection between the inlet region and/or the outlet region of the hollow sections 30 and the distributor 12 and/or the collector 14. The distributor 12 and/or the collector 14 can additionally still be screwed by means of screws 48 so that no or so little coolant as possible can exit at these connection points and/or in that, if possible, no coolant can exit at these connection points.

As can also be seen from FIG. 5, connection stubs 16, 18 for hoses (not shown) can be respectively installed at the distributor 12 and/or collector 14. These can be an integral component of the distributor or collector, as illustrated in FIG. 5, or bonded and/or screwed and/or welded thereto. The distributor 12 and the collector 14 can be connected via a web and/or a yoke (not shown) in order to provide the cooling module 10 with an increased stiffness and in order to serve as a connection possibility for an upper and/or lower finishing plate 56, 58 (see FIGS. 8A and B). An upper and/or lower finishing plate 56, 58 can be attached at the uppermost and/or lowermost hollow section 30 of a connection module 10 generally by means of the respective tongue and groove 34, 36 in order to protect the lowermost and/or uppermost battery cell 22.

The battery cells 22 can also be inserted into the coolant compartments 24 of the cooling module 10 after the completion thereof. It is thereby avoided that these are damaged on brazing and/or welding or bonding of the distributor 12 or the collector 14.

Figure 6:
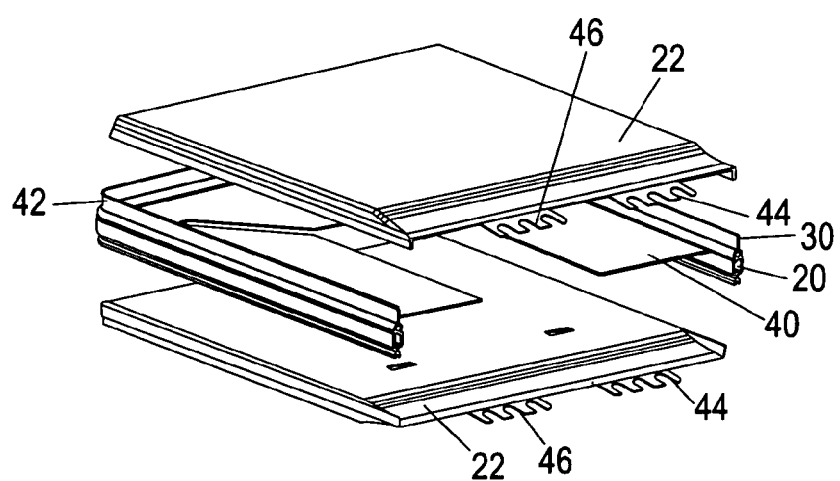
FIG. 6 is an exploded view of a U-shapedly bent hollow section in accordance with the invention having cooling wings.

The FIG. 6 shows an exploded view of an alternative hollow section 30 which is bent in U-shape. The U-shape of the bent hollow section 30 comprises so-called cooling wings 40 which can be manufactured in an extrusion process as a part of a hollow section 30 or which can be inserted prior to the bending of the hollow section 30 as a sheet metal plate 40 into the groove 28 of the hollow section 30 and which can be notched prior to the bending to a U-shape of the hollow section 30 at the positions 42 where the shaping should take place.

Figure 7A:
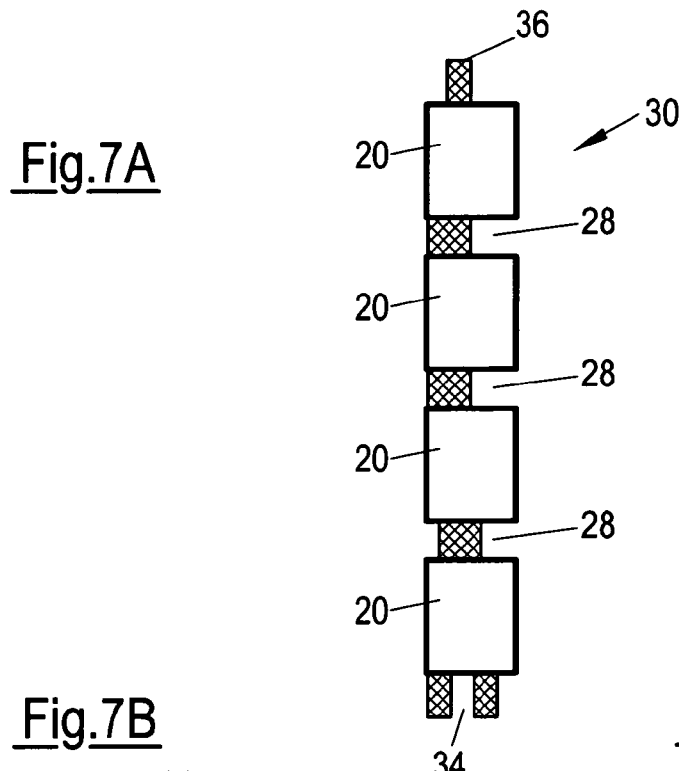
FIGS. 7A-7E are sections of hollow sections in accordance with the invention similar to the section of FIG. 2C in schematic form.

The FIG. 7A shows a hollow section 30 in section similar to the section of FIG. 2C. In this example, the hollow section 30 has four individual cooling passages 20, with a respective groove 28 being provided for the provision of a cooling plate 26 and/or for the attachment of cooling wings 40 between the individual cooling passages 20. Depending on the requirement one and/or two battery cells can be inserted between two neighboring grooves 28 in the example of FIG. 7. At the upper and lower ends of FIG. 7A a respective tongue-and-groove connection 34, 36 can be seen.

Figure 7B:
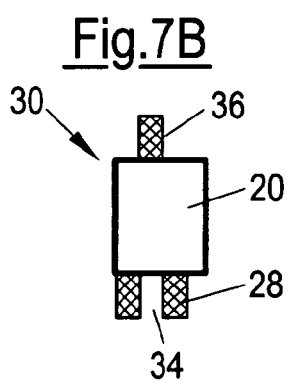

The FIG. 7B shows a section similar to that of FIG. 7A. In this example a simplified hollow section 30 can be seen which has a cooling passages 20. At the upper and lower end of the hollow section 30 a groove and a tongue 34, 36 can be seen, which can be used to connect the hollow section 30 to further hollow sections 30. The tongue and groove 34, 36 of connected hollow sections 30 can form a tongue-and-groove connection in this respect. In this connection the space which is formed between the connected hollow sections 30 can be used as a groove 28 for the provision of cooling plates 26 and/or cooling wings 40. This means that the width of a groove 28 can be determined by the length of a tongue 36 which is connected to a groove 34 of an adjacent section 30 and/or the width of the groove 28 can correspond to the depth of a groove 34 which is connected to a tongue 36 of an adjacent hollow section 30.

Figure 7C:
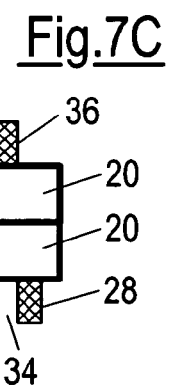

The FIG. 7C shows a further hollow section 30 in which two cooling passages 20 can be seen between the tongue-and-groove connection 34, 36. Due to the fact that two different cross-sections of cooling passages 20 are present in a hollow section 30, different flow velocities of the coolant are present between individual cooling passages 20 of the hollow section 30. The different flow velocities can be used for a targeted heat discharge from the battery cells 22.

Figure 7D:
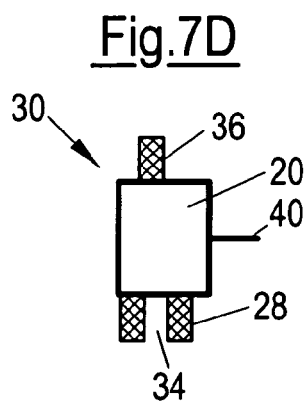

The FIG. 7D shows a further hollow section 30 in which a cooling wing 40 is provided which can be directly provided in an extrusion process of the hollow section 30. The hollow section 30 of FIGS. 7A to 7D are bonded and/or brazed to the respective collector 14 and/or distributor 12 after the U-shaped bending and assembly into the desired battery module 50 in order to manufacture a liquid-tight connection therebetween.

Figure 7E:
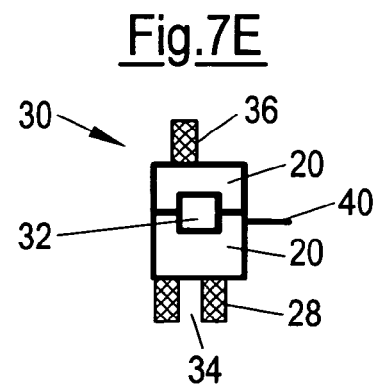

The FIG. 7E shows a further hollow section 30 in which two cooling passages 20 having different cross-sections are provided. A screw hole 32 is provided between the cooling passages 20. A cooling wing 40 is also provided in the official letter 30 of FIG. 7E.

In this connection it should be noted that a hollow section 30 which can be used in the present application must have at least one cooling passage. Whether a groove 28 and/or a cooling wing 40 or a screw hole 32 or further cooling passages are provided depends on the respective field of applications which is intended for the cooling module 10. Furthermore, the cooling passage 20 can have a cross-section, which is e.g. round, oval, rectangular, or have any other arbitrary geometric shape, as long as this shape ensures a heat transfer from the battery cell to the coolant which is guided in the cooling passage.

A hollow section 30 which is composed of a plurality of symmetric hollow sections 30 which are connected by welding, brazing and/or bonding, and has corresponding weld beads and/or brazing points or bonding points 62 (see FIG. 10A) or which are also connected by an angled tube 60 (see FIG. 10B) which is inserted into the cooling passages 20 by means of brazing and/or welding and/or bonding can be used instead of a bent hollow section 30. In this connection it would also be possible to provide a cooling module 10 which is composed of two rows of hollow sections 30 which respectively have a separate distributor 12 and/or collector 14. The respective distributor 12 and/or collector 14 of such a cooling module 10 could respectively be connected via a web and/or a yoke (not shown) in order to provide the cooling module 10 with an increased stiffness.

Figure 8A:
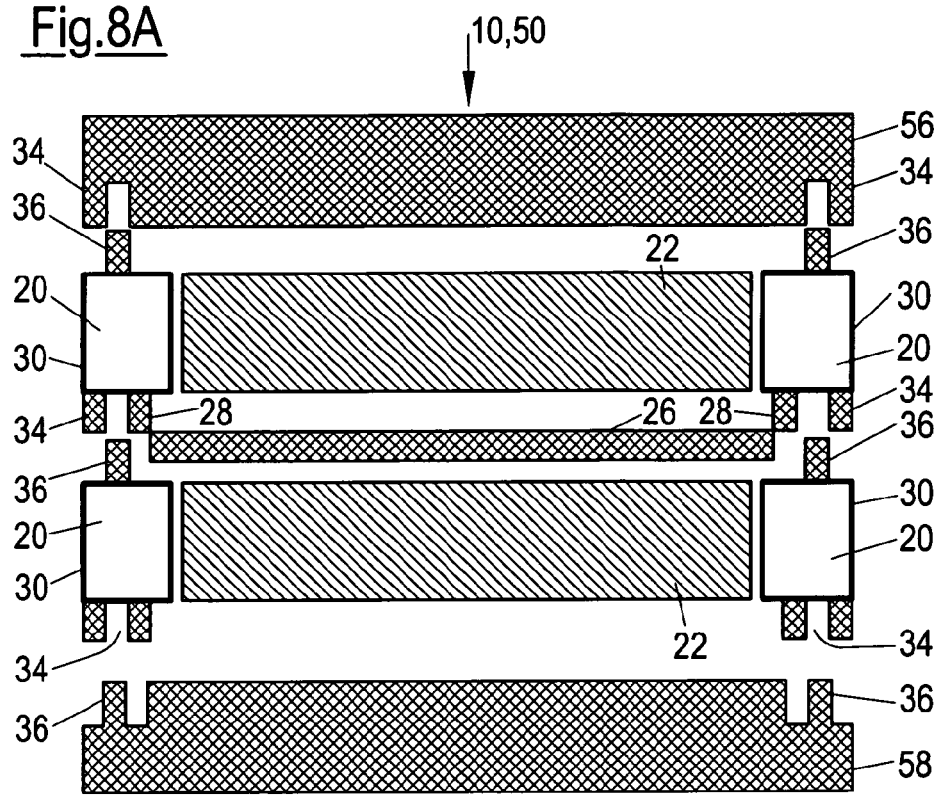
FIGS. 8A, 8B are perspective illustrations of cooling modules in accordance with the invention.
Figure 8B:
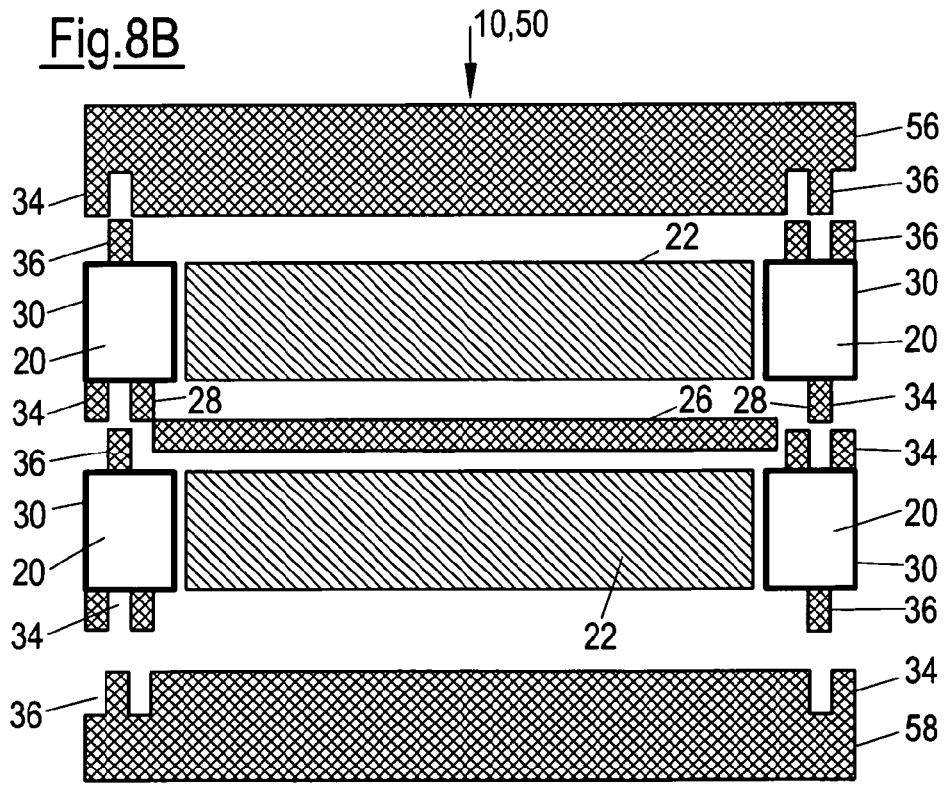

The FIGS. 8A and 8B respectively show a schematic exploded view of cooling modules 10 in accordance with the invention. At their upper and lower ends a respective upper and/or lower finishing plate 56, 58 is arranged at the hollow sections 30. Such finishing plates 56, 58 can be provided for each cooling module 10. In the example of FIG. 8A, a cooling module 10 is shown which is formed from two U-shaped bent hollow sections 30. The lower plate 58 has a surrounding tongue 36 and the upper plate 56 has a surrounding groove 34.

In contrast to this, the FIG. 8B shows a cooling module 10 which has two rows of hollow sections 30 in which the groove and tongue 34, 36 of the individual rows are swapped in their position so that a left row of hollow sections 30 has a groove 34 at this upper end and a right row of hollow sections 30 has a tongue 36 at its upper end so that the same finishing plate 56, 58 can complete the cooling module 10 at the lower and/or upper end of the two rows of hollow sections. Such a finishing plate 56, 58 has a groove 34 at an end of a side and a tongue 36 at the other end of this side.

Figure 9A:
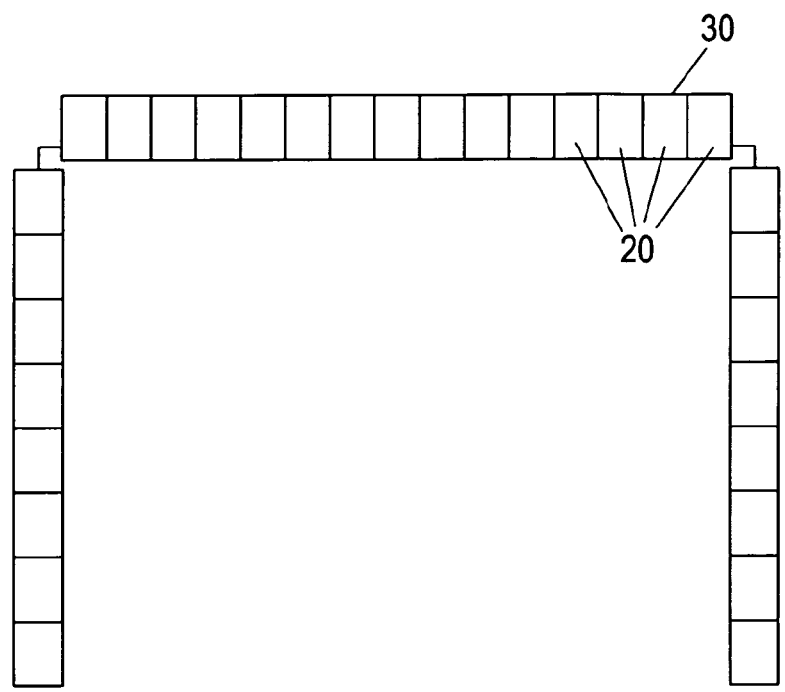
FIGS. 9A, 9B are views from above of hollow sections in accordance with the invention.

The FIGS. 9A and/or 9B respectively show a section of a hollow section 30 which is manufactured in an extrusion process directly with three sides in order to form a three-sided cooling module 10. Whereas in the previously described examples the cooling passages 20 were described and designed such that the cooling passages 20 extend substantially in parallel to the width and the length of the individual battery cells 22, the FIGS. 9A and 9B show embodiments in which this is not necessarily the case.

Such a cooling module 10 can then have cooling passages 20 which extend perpendicular to the width and the length of the battery cells 22. In this case the respective distributor 12 and/or collector 14 are connected from above or below to the cooling module 10 having the shape of a parallelepiped.

Figure 9B:
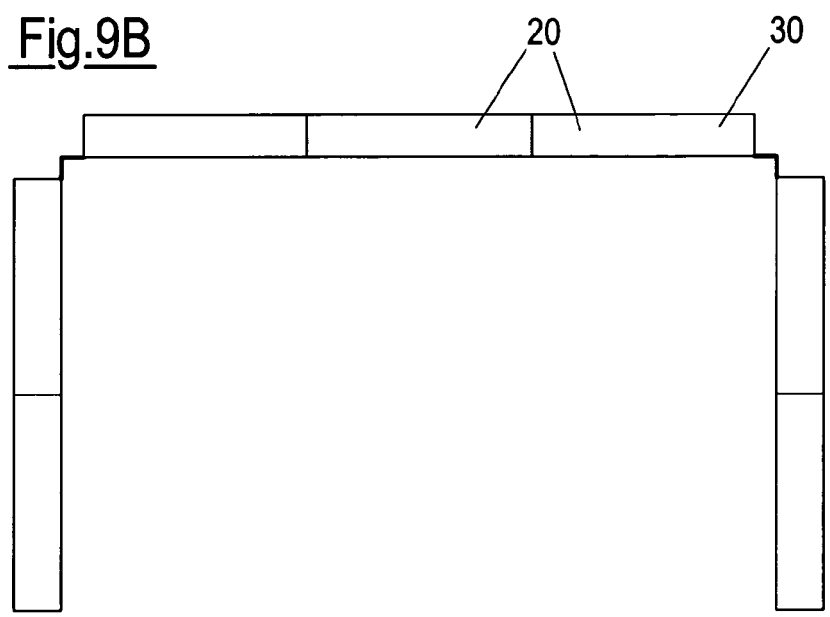

As an alternative to this, the hollow sections of FIGS. 9A and 9B can also be provided with sheet metal connection plates 24, 40 which extend in parallel to the two outer rows of cooling passages 20 in order to form a cooling module 10 which is bound it its height, but which can be changed in its width and has cooling compartments 24. In this case the distributor 12 and/or the collector 14 are respectively attached at the sides of the cooling module 10.

In order to manufacture a cooling module 10, one or more hollow sections 30 are cut to a desired length in a first step. This means that depending on the size of the battery cell 22 which can used in a cooling module 10 a hollow section 30 is cut so that three sides of a rectangular battery cell 22 are surrounded by the hollow section 30 after its bending. The hollow sections 30 are adapted in order to be stuck together at their longitudinal sides either with further hollow sections 30 and/or with finishing plates 56, 58 which can be stuck from above or below onto the finished cooling module 10 having the shape of a parallelepiped. In a second step the hollow section 30 or the hollow sections 30, or if a plurality of hollow sections 30 have been connected to one another, is/are bent into the desired U-shape. However, all individual hollow sections 30 can initially also be bent into the desired U-shape prior to these being connected to one another at their longitudinal sides. The hollow sections 30 can be connected by means of bonding, brazing, welding, pressing, screwing, clamping or gripping, and/or by means of a tongue-and-groove connection 34, 36.

After the reshaping of the hollow sections 30, cooling plates 26 can be inserted into the grooves 28 of the hollow section 30 at at least two oppositely disposed sides and preferably at at least three sides of the cooling module 10 and form compartments 24 therebetween which are dimensioned for the reception of battery cells 22. In the event that the hollow sections 30 were designed with a cooling wing 40, these cooling wings 40 are punched out and/or cut out at positions 42 where these should be bent prior to the bending, so that a deformation of the material of the individual cooling wings 40 can be avoided at the positions 42 and a cooling compartment 24 having the shape of a parallelepiped can thereby be ensured. Once the desired height of the cooling module 10 has been achieved and the battery cells 22 have been introduced into compartments 24 of a cooling module 10, a distributor 12 and/or a collector 14 is/are provided at the inlet region and/or the outlet region. As an alternative to this, the distributor and/or the collector can be connected to the hollow section or to the hollow sections 30 prior to the introduction of the battery cells into the compartments 24. These are attached approximately perpendicular to the individual cooling passages 20. During operation, the coolant is guided into the distributor 12 via a connection 16 and are distributed via the distributor into the individual cooling passages 20 and are subsequently collected in the collector 14 and guided to an outlet 18. The collector 14 and/or the distributor 12 can be welded, brazed, bonded to the hollow section 30 and/or to the hollow sections 30 or attached in a different manner, for example by means of a crimped connection, and are particularly preferably additionally screwed to one another by means of screws 48. Once a cooling module 10 has been manufactured, this can be post-treated, e.g. in an anodizing process and/or in a powder coating process, or the cooling module 10 can also simply be provided with a colored layer.

The hollow sections 30 of the present invention can be manufactured in an extrusion process. Preferably metals having a high heat conductivity are used as a material for the hollow sections 30, such as e.g. aluminium (200 W/mK), carbon steel, magnesium, nickel, etc.

Figure 11:
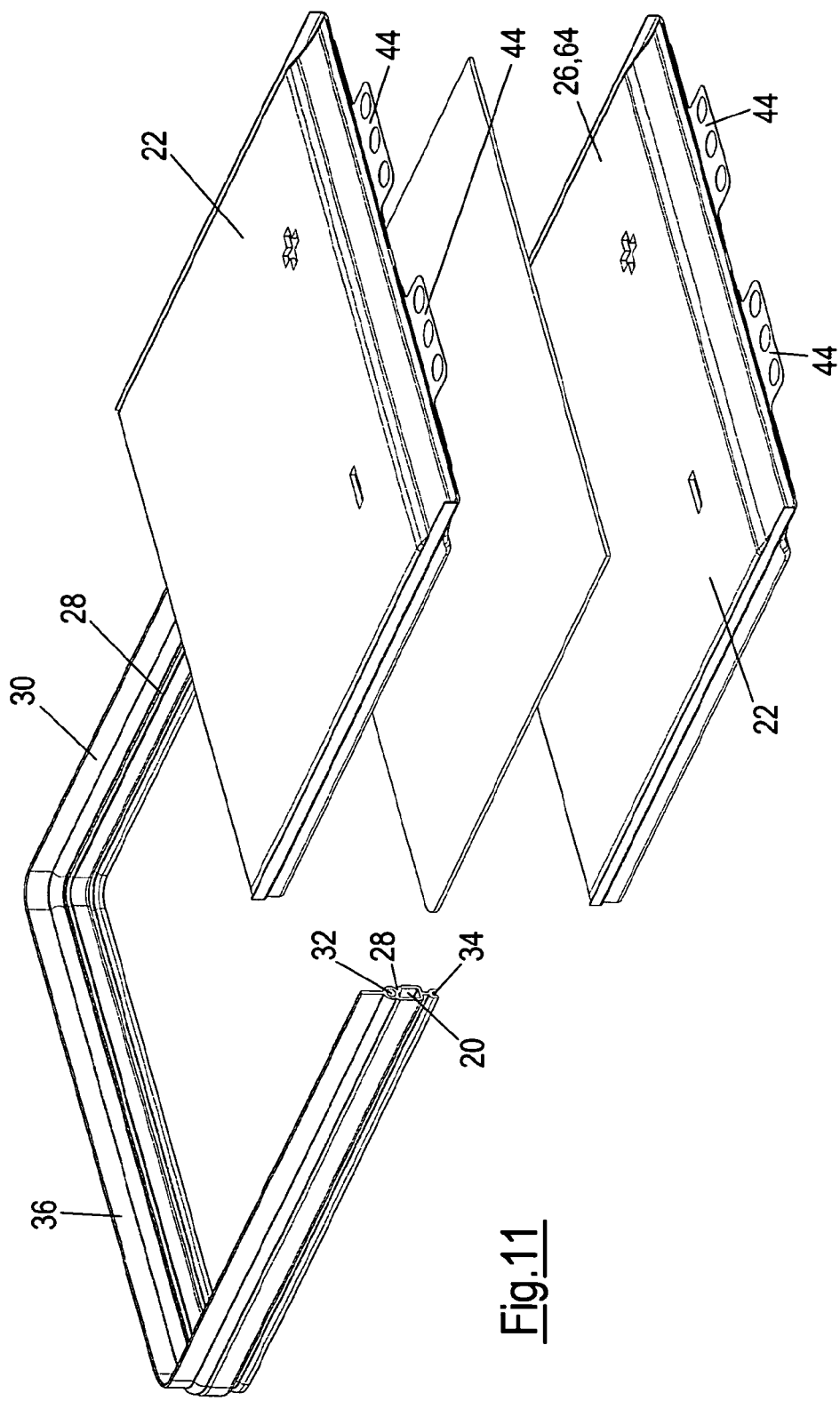
FIG. 11 is an exploded illustration of a further U-shapedly bent hollow section in accordance with the invention with an insert to be inserted and battery cells.

Geometric expressions, such e.g. above or below, are always used with reference to a herein shown embodiment and its arrangement in the respective figure. It is naturally understood that the embodiments can be changed in their geometric position. FIG. 11 shows an exploded view of a further U-shapedly bent hollow section 30 in accordance with the invention with an insert 64 to be inserted and two battery cells 22. The connections 44 at the battery cells 22 are provided with through holes in this example, through which a contact to further battery cells 22 is enabled. The insert 64 fills the space between two adjacent battery cells 22. In particular, the insert 64 satisfies one of the following functions: a heat-conducting function, e.g. when the insert 64 is configured as a cooling plate 26, a fire-resistant function and a mechanically supporting function. Typically, the insert is either laid into, bonded to, welded to, brazed to, or connected to the battery cell 22 and/or the hollow section 30 by means of a further method.

Figure 12:
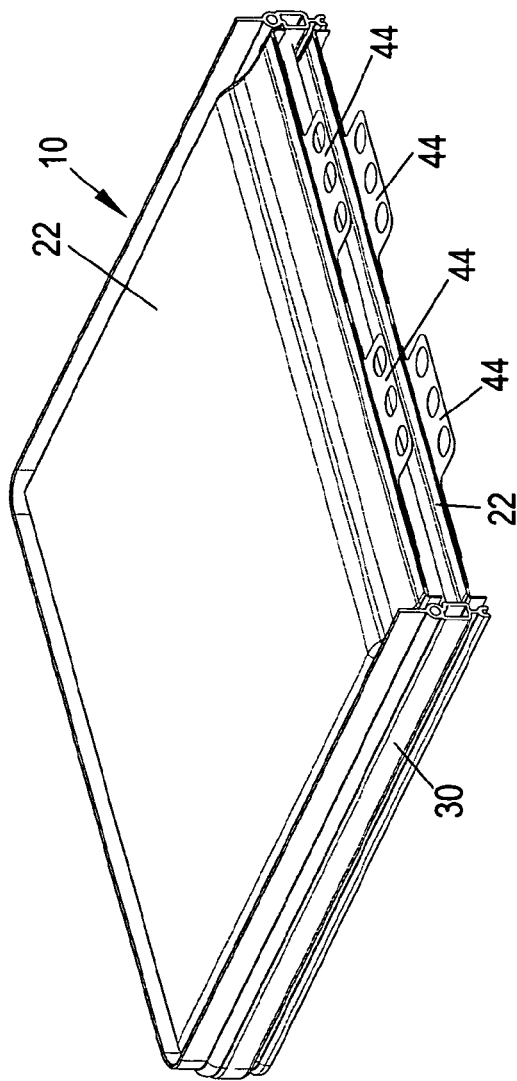
FIG. 12 is a cooling module having two inserted battery cells.
Figure 13:
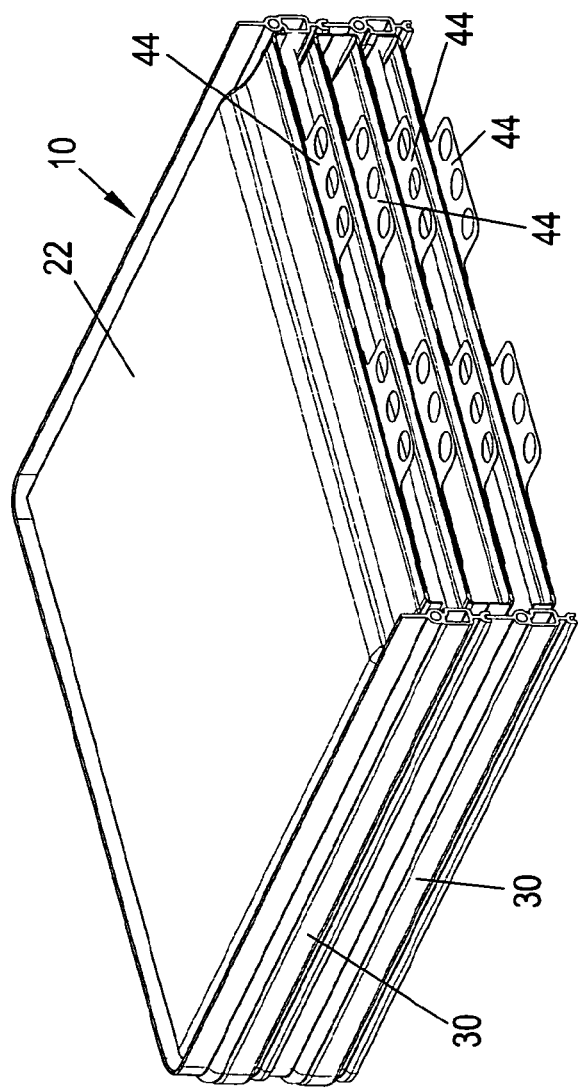
FIG. 13 is a cooling module having four inserted battery cells.

The FIG. 12 and the FIG. 13 respectively show a cooling module 10 with either two battery cells 22 or four battery cells 22 being provided in each compartment formed by a hollow section, and the battery cells 22 being equipped with connections 44 which are formed by through-holes.

Figure 14:
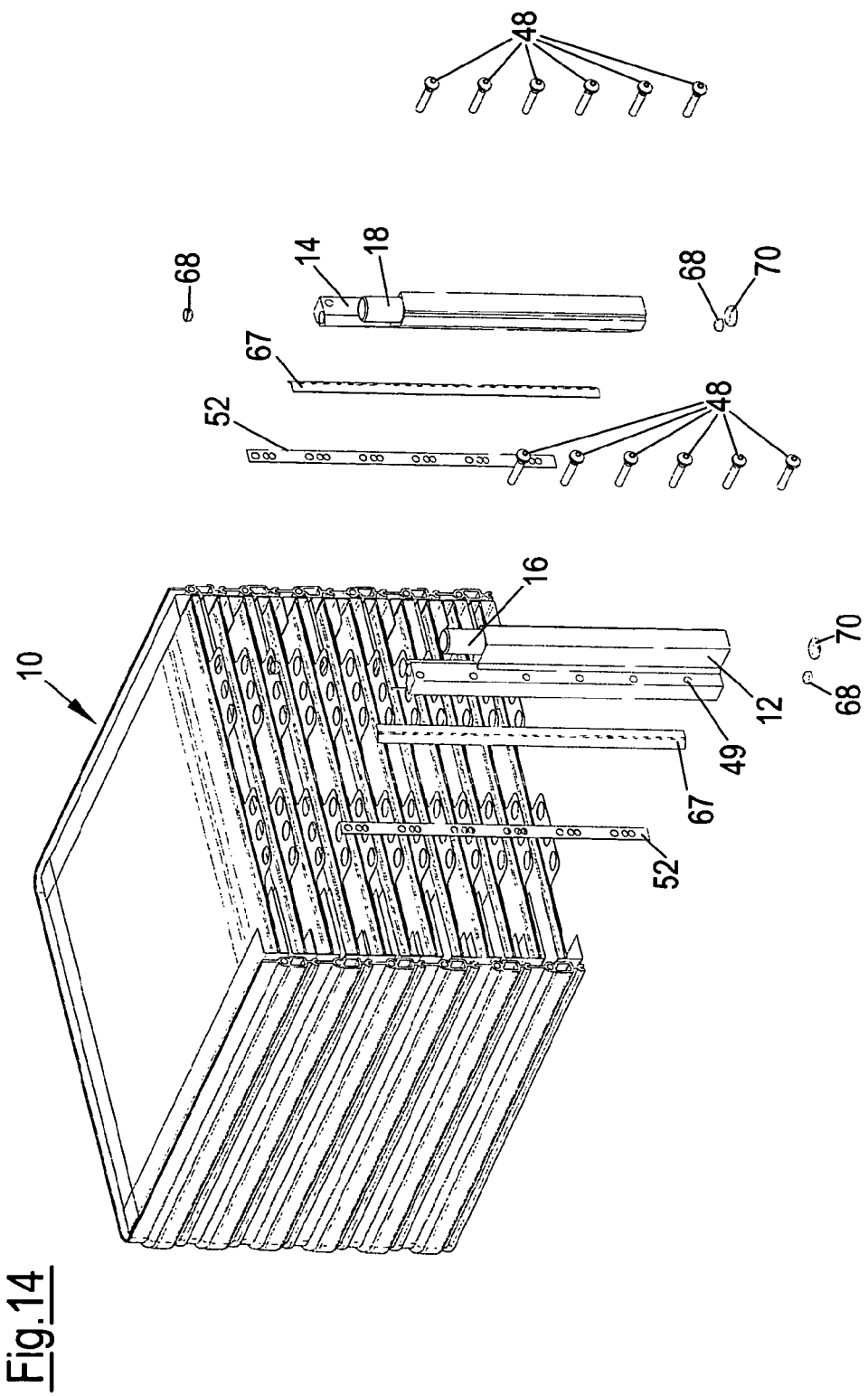
FIG. 14 is a perspective illustration of the assembly of a further cooling module in accordance with the invention having associated battery cells.
Figure 15:
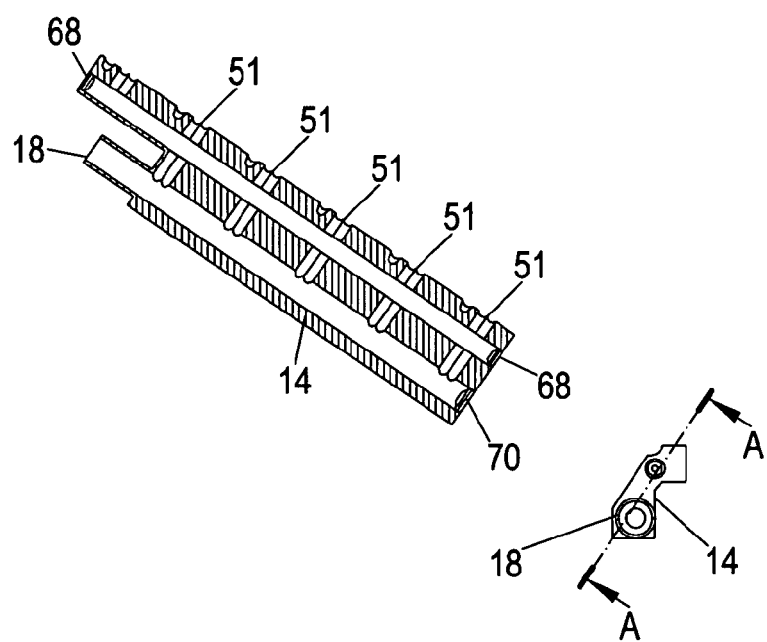
FIG. 15A is a top view on a collector.
FIG. 15B is a section through the collector in accordance with the sectional line A:A of FIG. 15B.

FIG. 14 shows a perspective illustration of the assembly of a further cooling module 10 in accordance with the invention with associated battery cells 22, while the FIG. 15A shows a top view onto a collector 14 in accordance with FIG. 14. The FIG. 15B shows a section through the collector 14 in accordance with the sectional line A:A of FIG. 15B. The cylindrical shaped connection 18 for a coolant can clearly be seen.

In this example, the collector 14 and/or the distributor 12 are made from an extruded material, in particular from aluminium or an aluminium alloy. In order to manufacture the collector 14 and/or the distributor 12 after the extrusion step, the cylindrically shape of connection 16 and/or 18 is milled, e.g. by means of a finger mill (not shown). Any arbitrary shaped connector 16 and/or 18 can in principle be manufactured by means of a suitable cutting tool at the collector 14 and/or distributor 12. Furthermore, the FIG. 14 shows two different types of connection stubs 68, 70 which are required in order to seal the hollow spaces of the collector 14 and/or distributor 12.

In the assembled state the screws 48 pass through the holes 49 in the distributor and through the corresponding holes in the seal 52 and in engage in the cylindrical passages 32 in the hollow sections. These can be thread-cutting screws 48 which clamp the distributor 12 and the seal 52 against the end face of the cooling module and/or the hollow sections 30. Bores 51 are provided axially displaced and inclined with respect to the holes 49 which can be seen in the FIGS. 15A and B which at their ends facing the hollow sections 30 lie flush with the cooling passages of the hollow sections and the corresponding openings in the seal 52 and lead into the inlet passages of the distributors 12 at their other end, this means into the passage having the larger diameter which is supplied by the connection. In this respect, the bores 51 pass through the more narrow distributor passage (this means the narrower longitudinal passage of the distributor which brings about the actual distribution in the hollow sections 30). The arrangement is the same for the collector 14, it is only attached in mirror symmetry. The extruded section for the distributor 12 and the collector 14 is, however, identical and this is also true for the seals 52. Hereby, an extremely rational manufacture can be achieved.

The reference numeral 67 represents an edge protection section which can likewise be manufactured as an extruded section.

The closure stubs 68, 70 can be seen in the sectional drawing at the lower end of the collector 14 and seal this towards the bottom. A further connection stub 68 can be seen at the upper end of the collector 14 and seals this cooling passage towards the top.

Figure 16:
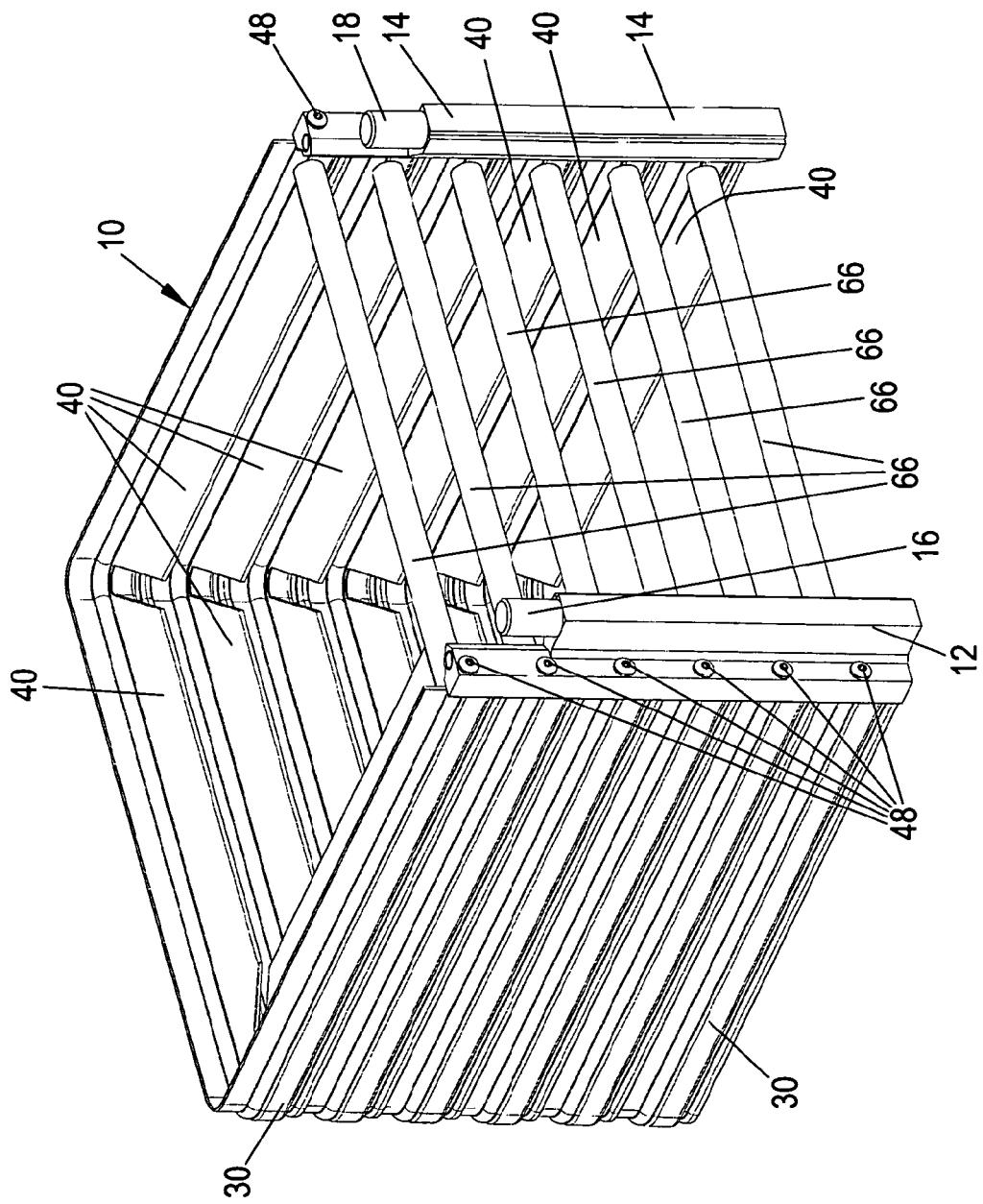
FIG. 16 is a perspective illustration of a further cooling module in accordance with the invention.

The FIG. 16 shows a perspective illustration of a further cooling module 10 in accordance with the invention. In this cooling module 10 a plurality of support sections 66 are provided which stabilize the cooling module 10 at its forward end. The support section can e.g. be made of a fiber-reinforced plastic tube 60.

The invention claimed is:

1. A method for the manufacture of a cooling module in the form of a body having an inner space for the reception of battery cells, wherein the body has one or more cooling passages extending in parallel to one another between an inlet region and an outlet region, wherein the body of the cooling module is formed approximately in the shape of a parallelepiped having at least first and second oppositely disposed sides and a third side, the cooling module having a liquid cooling at at least said first, second and third sides, which are consecutive sides, the body being formed at least partly from at least one length of a hollow section by one of the following steps:

bending the at least one length of the hollow section at at least two positions; and connecting consecutive lengths of the hollow section to one another in a fluid conducting manner;

to form at least two typically at least substantially rectangular corners, wherein the cooling module is subsequently provided with sheet metal connection plates which are attached at at least the first and second oppositely disposed sides in a heat conducting manner and which form compartments which are dimensioned for the reception of the battery cells, wherein the sheet metal connection plates and the cooling passages lie in a common plane.

2. A method in accordance with claim 1, wherein the at least one length of hollow section has first and second oppositely disposed longitudinal sides, wherein a plurality of lengths of hollow sections are provided which are connected to one another at adjacent longitudinal sides.

3. A method in accordance with claim 1, wherein, on the use of a plurality of lengths of hollow sections, these are bent prior to or after their connection.

4. A method in accordance with claim 1, wherein the sheet metal connection plates are inserted into guide grooves extending in the longitudinal direction of the length of hollow section.

5. A method in accordance with claim 1, wherein a distributor is provided in the inlet region, the distributor being arranged substantially perpendicular to the individual cooling passages and which distributes a coolant into the individual cooling passages during operation and wherein a collector is provided in the outlet region, and wherein the collector is arranged approximately perpendicular to the cooling passages and receives and guides the coolant from the individual cooling passages to an outlet during operation.

6. A method in accordance with claim 5, wherein the distributor and the collector are attached to the at least one length of hollow section.

7. A method in accordance with claim 1, wherein the length of hollow section is post-treated by at least one of an anodic treatment method, a coating method and powder coating and is thereby electrically insulated and protected.

8. A cooling module in the form of a body having an inner space for the reception of battery cells, wherein the body has one or more cooling passages extending in parallel to one another between an inlet region and an outlet region, wherein the body of the cooling module is approximately of the shape of a parallelepiped having at least first and second oppositely disposed sides and a third side and the body having a liquid cooling at at least said first, second and third sides, which are consecutive sides, the body having been formed at least partly from at least one length of a hollow section by one of the following steps:

bending the at least one length of the hollow section at at least two positions; and connecting consecutive lengths of the hollow section to one another at abutting ends in a fluid conducting manner; thereby forming at least two typically at least substantially rectangular corners, the cooling module further having sheet metal connection plates which are attached at at least said first and second oppositely disposed sides in a heat conducting manner and forming compartments which compartments are dimensioned for the reception of battery cells, wherein the sheet metal connection plates and the cooling passages lie in a common plane.

9. A cooling module in accordance with claim 8, wherein the at least one length of hollow section has first and second oppositely disposed longitudinal sides, wherein a plurality of lengths of hollow sections are provided which are connected to one another at adjacent longitudinal sides.

10. A cooling module in accordance with claim 9, wherein each length of hollow section has at least one coolant guiding passage disposed between the first and second longitudinal sides, there being a groove arranged at the first longitudinal side, and a tongue at the second longitudinal side, wherein the groove and the tongue lie in a common plane.

11. A cooling module in accordance with claim 10, wherein the length of hollow section has a guide groove which is laterally arranged with regard to the mentioned plane.

12. A cooling module in accordance with claim 10, wherein the length of hollow section has a second passage which is configured to manufacture a connection between the length of hollow section and a component attachable thereto.

13. A cooling module in accordance with claim 10, wherein the length of hollow section has first and second hollow fluid passages and a wall section formed therebetween.

14. A cooling module in accordance with claim 8, wherein the sheet metal connection plates are inserted into guide grooves extending in the longitudinal direction of the length of hollow section.

15. A cooling module in accordance with claim 8, wherein a distributor is provided in the inlet region, with the distributor being arranged approximately perpendicular to the individual cooling passages and distributing a coolant into the individual cooling passages during operation; and wherein a collector is provided in the outlet region, with the collector being arranged approximately perpendicular to the cooling passages and receiving and guiding the coolant from the individual cooling passages to an outlet during operation.

16. A cooling module in accordance with claim 8, wherein the cooling module is electrically insulated.

17. A cooling module in accordance with claim 8, wherein the cooling module is stabilized by a support section at a front end of the cooling module.

* * * * *